United States Patent
Eberle et al.

(10) Patent No.: US 8,547,984 B2
(45) Date of Patent: Oct. 1, 2013

(54) WEIGHTED DIFFERENTIAL SCHEDULER

(75) Inventors: Hans Eberle, Sunnyvale, CA (US); Wladyslaw Olesinski, Pleasanton, CA (US)

(73) Assignee: Oracle International Corporation, Redwood Shores, CA (US)

(*) Notice: Subject to any disclaimer, the term of this patent is extended or adjusted under 35 U.S.C. 154(b) by 206 days.

(21) Appl. No.: 13/234,715

(22) Filed: Sep. 16, 2011

(65) Prior Publication Data

US 2013/0070778 A1    Mar. 21, 2013

(51) Int. Cl.
*H04L 12/56*    (2011.01)

(52) U.S. Cl.
USPC .................................................. 370/412

(58) Field of Classification Search
USPC .......... 370/412–419, 428, 429; 709/232–235
See application file for complete search history.

(56) References Cited

U.S. PATENT DOCUMENTS

| | | | |
|---|---|---|---|
| 6,590,890 B1* | 7/2003 | Stolyar et al. | 370/349 |
| 7,864,778 B2* | 1/2011 | Lee et al. | 370/395.4 |
| 7,957,394 B1* | 6/2011 | Cohen et al. | 370/395.21 |
| 8,144,584 B1* | 3/2012 | Voruganti et al. | 370/232 |
| 8,385,358 B2* | 2/2013 | Olesinski et al. | 370/412 |
| 2008/0232377 A1* | 9/2008 | Murakawa | 370/395.41 |

OTHER PUBLICATIONS

M. Shreedhar, G. Varghese, "Efficient Fair Queueing Using Deficit Round Robin," SIG-COMM, Oct. 1995, 12 pages.
G. Chuanxiong, "SRR: An o(1) Time complexity packet Scheduler for Flows in Multi-Service Packet Networks," SIGCOMM, Aug. 27-31, 2001, 12 pages.
R. Sprague, "Fundamental Concepts of the Digital Differential Analyzer Method of Computation," Mathematical Tables and Other Aids to Computation, vol. 6, No. 37, Jan. 1952, 9 pages.

* cited by examiner

*Primary Examiner* — Dmitry H Levitan
(74) *Attorney, Agent, or Firm* — Osha Liang LLP

(57) ABSTRACT

A method for managing packets, including: identifying a first plurality of packets from a first packet source having a first weight; identifying a second plurality of packets from a second packet source having a second weight; obtaining a first weight ratio based on the first weight and the second weight; obtaining an error threshold and a first error value corresponding to the second packet source, where the error threshold exceeds the first error value; forwarding a first packet from the first packet source in response to the error threshold exceeding the first error value; incrementing the first error value by the first weight ratio; forwarding a first packet from the second packet source, after incrementing the first error value and in response to the first error value exceeding the error threshold; and decrementing the first error value.

20 Claims, 9 Drawing Sheets

Example 1
410

$W_1 = 2, W_2 = 3$

Register Values:
 ETR = ½
 EDR = 1
 WRR 2 = $W_2/W_1$ = 1.5

| Packet Forwarded | | P1 | P2 | P2 | P1 | P2 |
|---|---|---|---|---|---|---|
| EVC 2 | 0 | 1.5 | 0.5 | -0.5 | 1 | 0 |

Inter Departure Delays for flow 1: 3, 2
Inter Departure Delays for flow 2: 1, 2, 2

Jitter of flow 1 = 0.50   Jitter of flow 2 = 0.47

P1 = Packet from flow 1
P2 = Packet from flow 2

Example 2
420

$W_1 = 2, W_2 = 3$

Register Values:
 ETR = $W_1$ = 2
 EDR = $2W_1$ = 4
 WRR 2 = $2W_2$ = 6

| Packet Forwarded | | P1 | P2 | P2 | P1 | P2 |
|---|---|---|---|---|---|---|
| EVC 2 | 0 | 6 | 2 | -2 | 4 | 0 |

Inter Departure Delays for flow 1: 3, 2
Inter Departure Delays for flow 2: 1, 2, 2

Jitter of flow 1 = 0.50   Jitter of flow 2 = 0.47

P1 = Packet from flow 1
P2 = Packet from flow 2

Example 1
610

$W_1 = 2, W_2 = 3, W_3 = 5$
Register Values:
  ETR = ½
  EDR = 1
  WRR 2 = $W_2/(W_1 + W_3)$ = 3/(2 + 5) = 3/7
  WRR 3 = $W_3/(W_1 + W_2)$ = 5/(2 + 3) = 1

| Packet Forwarded | | P1 | P3 | P2 | P3 | P1 | P2 | P3 | P2 | P3 |
|---|---|---|---|---|---|---|---|---|---|---|
| EVC 2 | 0 | 3/7 | 6/7 | -1/7 | 2/7 | 5/7 | -2/7 | 1/7 | 4/7 | -3/7 | 0 |
| EVC 3 | 0 | 1 | 0 | 1 | 0 | 1 | 2 | 1 | 0 | 1 | 0 |

P1 = Packet from flow 1
P2 = Packet from flow 2
P3 = Packet from flow 3

Inter Departure Delays for Flow 1: 4, 6
Inter Departure Delays for Flow 2: 3, 3, 4
Inter Departure Delays for Flow 3: 2, 3, 1, 2, 2

Jitter of Flow 1 = 1   Jitter of Flow 2 = 0.47   Jitter of flow 3 = 0.63

---

Example 2
620

$W_1 = 2, W_2 = 3, W_3 = 5$
Register Values:
  ETR = ½ × 2 × $(W_1 + W_2)$ × $(W_1 + W_3)$ = 5 × 7 = 35
  EDR = 2 × $(W_1 + W_2)$ × $(W_1 + W_3)$ = 2 × 5 × 7 = 70
  WRR 2 = $W_2$ × 2 × $(W_1 + W_2)$ = 3 × 2 × 5 = 30
  WRR 3 = $W_3$ × 2 × $(W_1 + W_2)$ = 5 × 2 × 7 = 70

| Packet Forwarded | | P1 | P3 | P2 | P3 | P1 | P2 | P3 | P2 | P3 |
|---|---|---|---|---|---|---|---|---|---|---|
| EVC 2 | 0 | 30 | 60 | -10 | 20 | 50 | -20 | 10 | 40 | -30 | 0 |
| EVC 3 | 0 | 70 | 0 | 70 | 0 | 70 | 140 | 70 | 0 | 70 | 0 |

P1 = Packet from flow 1
P2 = Packet from flow 2
P3 = Packet from flow 3

Inter Departure Delays for Flow 1: 4, 6
Inter Departure Delays for Flow 2: 3, 3, 4
Inter Departure Delays for Flow 3: 2, 3, 1, 2, 2

Jitter of Flow 1 = 1   Jitter of Flow 2 = 0.47   Jitter of flow 3 = 0.63

FIG. 8

$W_1 = 2, W_2 = 3, W_3 = 5$
Register Values:
  ETR = ½
  EDR = 1
  WRR 1 = $W_1/(W_1 + W_2 + W_3) = 2/(2 + 3 + 5) = 1/5$
  WRR 2 = $W_2/(W_1 + W_2 + W_3) = 3/(2 + 3 + 5) = 3/10$
  WRR 3 = $W_3/(W_1 + W_2 + W_3) = 5/(2 + 3 + 5) = 1/2$

| Packet Forwarded | | P3 | P2 | P3 | P1 | P2 | P3 | P1 | P2 | P3 |
|---|---|---|---|---|---|---|---|---|---|---|
| EVC 1 | 0 | 1/5 | 3/5 | 0 | -1/5 | 1/5 | 2/5 | -1/5 | 0 | 1/5 |
| EVC 2 | 0 | 3/10 | 6/10 | -1/10 | 2/10 | -2/10 | 1/10 | 4/10 | 7/10 | 0 | 3/10 |
| EVC 3 | 0 | 1/2 | 0 | 1/2 | 1 | 1 | 1/2 | 0 | 1/2 | 1 | 1/2 |

Jitter of Flow 1 = 0   Jitter of Flow 2 = 0.47   Jitter of flow 3 = 0.89

Example 1
810

P1 = Packet from flow 1
P2 = Packet from flow 2
P3 = Packet from flow 3

---

$W_1 = 2, W_2 = 3, W_3 = 5$
Register Values:
  ETR = ½ × 2 × $(W_1 + W_2 + W_3) = 2 + 3 + 5 = 10$
  EDR = 2 × $(W_1 + W_2 + W_3) = 2 × (2 + 3 + 5) = 20$
  WRR 1 = $2W_1 = 4$
  WRR 2 = $2W_2 = 6$
  WRR 3 = $2W_3 = 10$

| Packet Forwarded | | P3 | P2 | P3 | P1 | P2 | P3 | P1 | P2 | P3 |
|---|---|---|---|---|---|---|---|---|---|---|
| EVC 1 | 0 | 4 | 12 | 0 | -4 | 4 | 8 | -4 | 0 | 4 |
| EVC 2 | 0 | 6 | 12 | -2 | 4 | -4 | 2 | 14 | 0 | 6 |
| EVC 3 | 0 | 10 | 0 | 10 | 20 | 20 | 10 | 10 | 20 | 10 |

Jitter of Flow 1 = 0   Jitter of Flow 2 = 0.47   Jitter of flow 3 = 0.89

Example 2
820

P1 = Packet from flow 1
P2 = Packet from flow 2
P3 = Packet from flow 3

WEIGHTED DIFFERENTIAL SCHEDULER

BACKGROUND

Network-on-Chip (NoC) is a model for communications within systems implemented on a single chip (e.g., a silicon chip). In a NoC system, multiple devices such as processor cores, memories, IO devices, and specialized logic blocks exchange data (e.g., data packets) using a network. A switched NoC is constructed from multiple point-to-point data links interconnected by switches, such that the data packets can be relayed from any source device to any destination device over several data links, by way of specific routing decisions at the switches.

When packets from two or more sources arrive at a switch, a scheduler embedded in the switch decides how the packets will be forwarded. Each packet source may require a certain Quality of Service (QoS), such as a minimum bandwidth, maximum latency, or maximum jitter, to properly send information (e.g., low latency is needed for IP telephony). To guarantee a certain QoS for each packet source, various scheduling algorithms based on timestamp or round-robin methods have been developed. They offer algorithmic complexities ranging from constant to linear, with varying delay bounds, jitter, and fairness.

Deficit round robin is an attractive scheduling algorithm because of its relatively low complexity, especially when compared with timestamp-based scheduling algorithms. However, deficit round robin can serve one packet source for a long time before it "switches" to another packet source. This results in high jitter since the delay between any two consecutive packets that are forwarded from one packet source may vary greatly, a consequence that is undesirable from a QoS perspective. Another scheme that generally provides lower jitter than deficit round robin is called smoothed round robin. Although relatively simple to implement in a high level programming language, this scheme relies on processing a matrix that stores the relative weights of the sources in its rows, and hence its hardware implementation is more difficult.

In order to achieve improved QoS on simple systems such as NoCs, a low-jitter scheduling algorithm must be designed that can be easily implemented in hardware.

SUMMARY OF INVENTION

In general, in one aspect, the invention relates to a method for managing packets. The method comprises: identifying a first plurality of packets from a first packet source having a first weight; identifying a second plurality of packets from a second packet source having a second weight; obtaining a first weight ratio based on the first weight and the second weight; obtaining an error threshold and a first error value corresponding to the second packet source, wherein the error threshold exceeds the first error value; forwarding a first packet from the first packet source in response to the error threshold exceeding the first error value; incrementing the first error value by the first weight ratio; forwarding a first packet from the second packet source, after incrementing the first error value and in response to the first error value exceeding the error threshold; and decrementing the first error value.

In general, in one aspect, the invention relates to a method for managing packets. The method comprises: identifying a plurality of packet sources having a plurality of weights; calculating a sum by adding the plurality of weights; calculating a first weight ratio for a first packet source by dividing a first weight corresponding to the first packet source by the sum; calculating a second weight ratio for a second packet source by dividing a second weight corresponding to the second packet source by the sum, wherein the plurality of weights comprises the first weight and the second weight; incrementing a first error value corresponding to the first packet source by the first weight ratio; incrementing a second error value corresponding to the second packet source by the second weight ratio; forwarding, in response to the first error value exceeding an error value threshold after incrementing the first error value, a packet from the first packet source; decrementing, in response to forwarding the packet, the first error value by an error decrement value; and incrementing, in response to forwarding the packet, the first error value by the first weight ratio and the second error value by the second weight ratio.

In general, in one aspect, the invention relates to a system for managing packets. The system comprises: a first queue storing a plurality of packets from a first packet source having a first weight; a second queue storing a plurality of packets from a second packet source having a second weight; a first error value counter configured to decrement in response to forwarding a packet from the second queue; a first weight ratio register configured to store a first weight ratio based on the first weight and the second weight; an error threshold register configured to store an error threshold; and a scheduling engine operatively connected to the first queue, the second queue, the first error value counter, the first weight ratio register, and the error threshold register, wherein the scheduling engine comprises functionality to: forward a first packet from the first queue in response to the error threshold exceeding a value of the first error value counter; increment the first error value counter by the first weight ratio; forward a first packet from the second queue, after incrementing the first error value counter and in response to the value of the first error value counter exceeding the error threshold; and decrement the first error value counter.

In general, in one aspect, the invention relates to a non-transitory computer readable storage medium comprising instructions for managing packets. The instructions comprising functionality for: identifying a first plurality of packets from a first packet source having a first weight; identifying a second plurality of packets from a second packet source having a second weight; obtaining a first weight ratio based on the first weight and the second weight; obtaining an error threshold and an error value corresponding to the second packet source, wherein the error threshold exceeds the error value; forwarding a first packet from the first packet source in response to the error threshold exceeding the error value; incrementing the error value by the first weight ratio; forwarding a first packet from the second packet source, after incrementing the error value and in response to the error value exceeding the error threshold; and decrementing the error value.

Other aspects of the invention will be apparent from the following description and the appended claims.

BRIEF DESCRIPTION OF DRAWINGS

FIGS. 4, 6, and 8 show examples in accordance with one or more embodiments of the invention.

DETAILED DESCRIPTION

Figure 1:
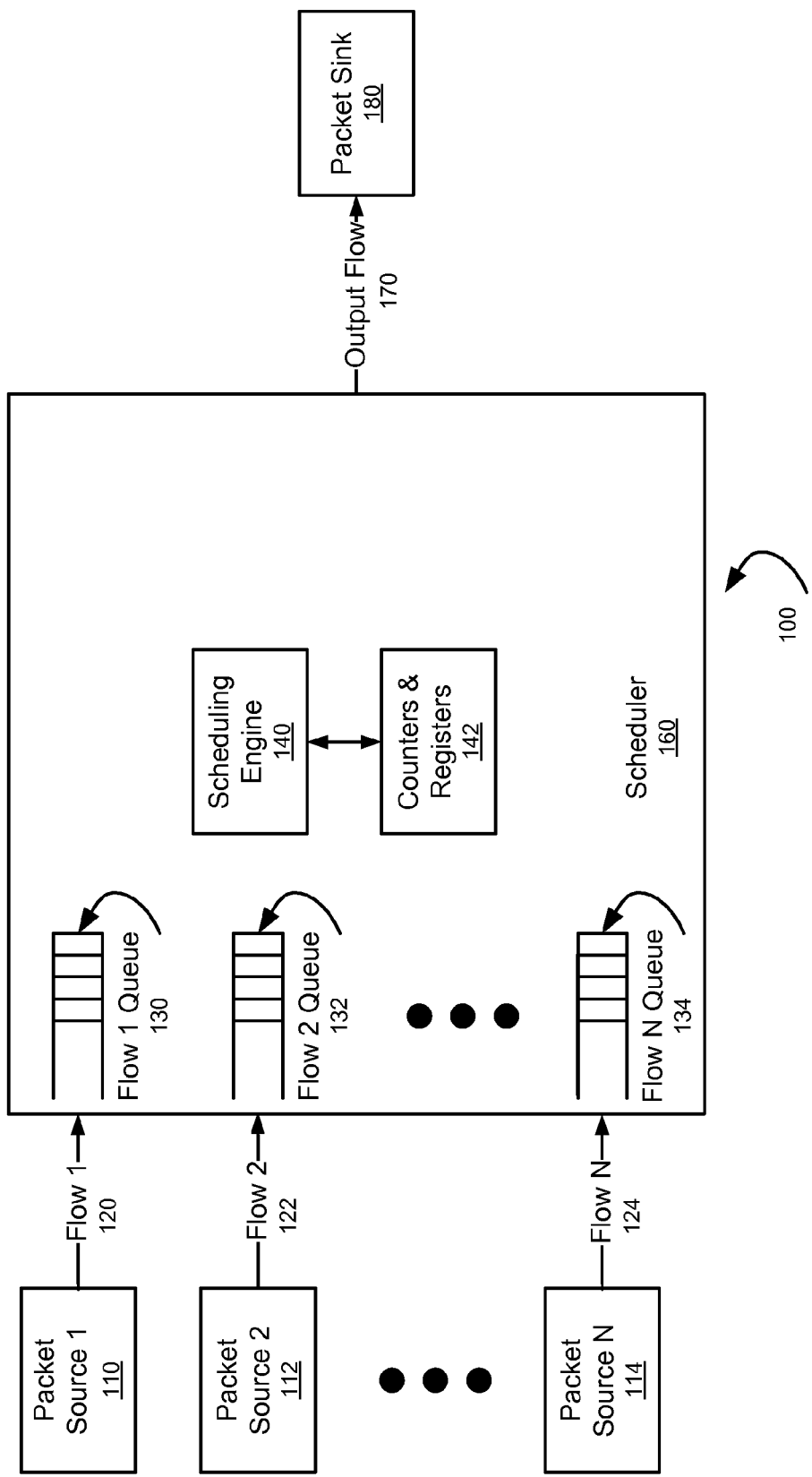
FIG. 1 shows a system having multiple components in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method for managing packets (e.g., data packets, control packets) from two or more packet sources (e.g., streaming media, IP telephony, file transfer) with potentially different pre-assigned bandwidth allocations (i.e., weights). The scheduler receives as input a flow of packets from each packet source and outputs (i.e., forwards) a single flow of packets to a packet sink (e.g., switch, network interface card, NoC, queue) according to a scheduling algorithm implemented by the scheduler. The scheduler includes multiple counters and registers for determining when to alternate between forwarding packets from one source and forwarding packets from another source. In one or more embodiments of the invention, the scheduling algorithm produces low-jitter scheduling for the packet sources while still adhering to each packet source's bandwidth allocation (i.e., weight). The scheduler may be part of a switched NoC architecture (i.e., the switches and the devices may be located on a single chip).

FIG. 1 shows a system (100) in accordance with one or more embodiments of the invention. As shown in FIG. 1, the system (100) has multiple packet sources (i.e., packet source 1 (110), packet source 2 (112), packet source N (114)). Each packet source generates a flow of packets (i.e., flow 1 (120), flow 2 (122), flow N (124)) that arrives at a scheduler (160). The scheduler forwards the packets, generating an output flow (170) to a packet sink (180).

Each packet source (110, 112, 114) and its corresponding flow (120, 122, 124) may have a certain priority (i.e., weight). The weight determines how often packets will be forwarded from the packet source and flow in question. For example, if flow 1 (120) has a weight of three and flow 2 (122) has a weight of one, then three packets from flow 1 (120) will be forwarded for every one packet of flow 2 (122). Each weight may depend on the type of packet source (110, 112, 114), with some packet sources possibly having higher weight than others.

In one or more embodiments of the invention, the scheduler (160) has multiple components including multiple queues (i.e., flow 1 queue (130), flow 2 queue (132), flow N queue (134)), a scheduling engine (140) and counters and registers (142). In one or more embodiments of the invention, the counters and registers (142) are part of the scheduling engine (140). Further, the queues (130, 132, 134), the scheduling engine (140), and the counters and registers (142) may each be implemented in any combination of hardware or software. Each component of the scheduler (160) is discussed below.

In one or more embodiments of the invention, the queues (130, 132, 134) include any combination of hardware (e.g., multiplexers, flip flops, registers, transistors, integrated circuits, random-access memory (RAM), etc.) and software components (e.g., an instruction set executing on a hardware component). The queues are used to temporarily store (i.e., buffer) incoming packets from the flows (120, 122, 124). In one or more embodiments of the invention, the queues (130, 132, 134) are located outside the scheduler (160) (i.e., external to the scheduler (160)).

In one or more embodiments of the invention, the packet sink (180) is a second scheduler (not shown). Accordingly, the output flow (170) from the first scheduler may be one of multiple incoming flows to the second scheduler, which effectively schedules the output flow (170) with the multiple incoming flows. Those skilled in the art, having benefit of this detailed description, will appreciate that many schedulers may be connected in series (i.e., with the output of one scheduler used as an input to another scheduler), and thus any number of flows may be scheduled even if each scheduler is capable of scheduling only two flows.

In one or more embodiments of the invention, the counters and registers (142) include any combination of hardware (e.g., multiplexers, flip flops, transistors, integrated circuits, (RAM), etc.) and software components (e.g., an instruction set executing on a hardware component). The counter and registers (142) may store and modify values used by the scheduling engine (140).

In one or more embodiments of the invention, the scheduling engine (140) includes any combination of hardware (e.g., multiplexers, flip flops, registers, lookup tables, transistors, processors, integrated circuits, RAM, etc.) and software components (e.g., an instruction set executing on a hardware component). The scheduling engine (140) is configured to assemble and/or forward a sequence of packets according to a scheduling algorithm. The scheduling algorithm determines the sequence of packets from each queue (130, 132, 134) to be forwarded (e.g., outputted) to the packet sink (180). In one or more embodiments of the invention, scheduled packets are temporarily stored (i.e., forwarded to a buffer) in an output queue (not shown) located within the scheduler (160) before being forwarded to the packet sink (180). In one or more embodiments of the invention, the scheduler stores instructions dictating the order in which packets are to be forwarded or buffered (i.e., the instructions are used to assemble the sequence of packets or to forward the packets directly) instead of actually forwarding the packets. Those skilled in the art will appreciate that the scheduler (160) and the scheduling algorithm are not limited to forwarding data packets. For example, the scheduling algorithm may be used for allocating resources (e.g., processors, memory, storage, and any other hardware component) to multiple requesters (e.g., threads of an operating system or computer application) having various weights. The scheduling algorithm may be implemented in software and executed on the scheduling engine (140). Alternatively, the scheduling engine (140) may include a hardware implementation of the scheduling algorithm.

Figure 2:
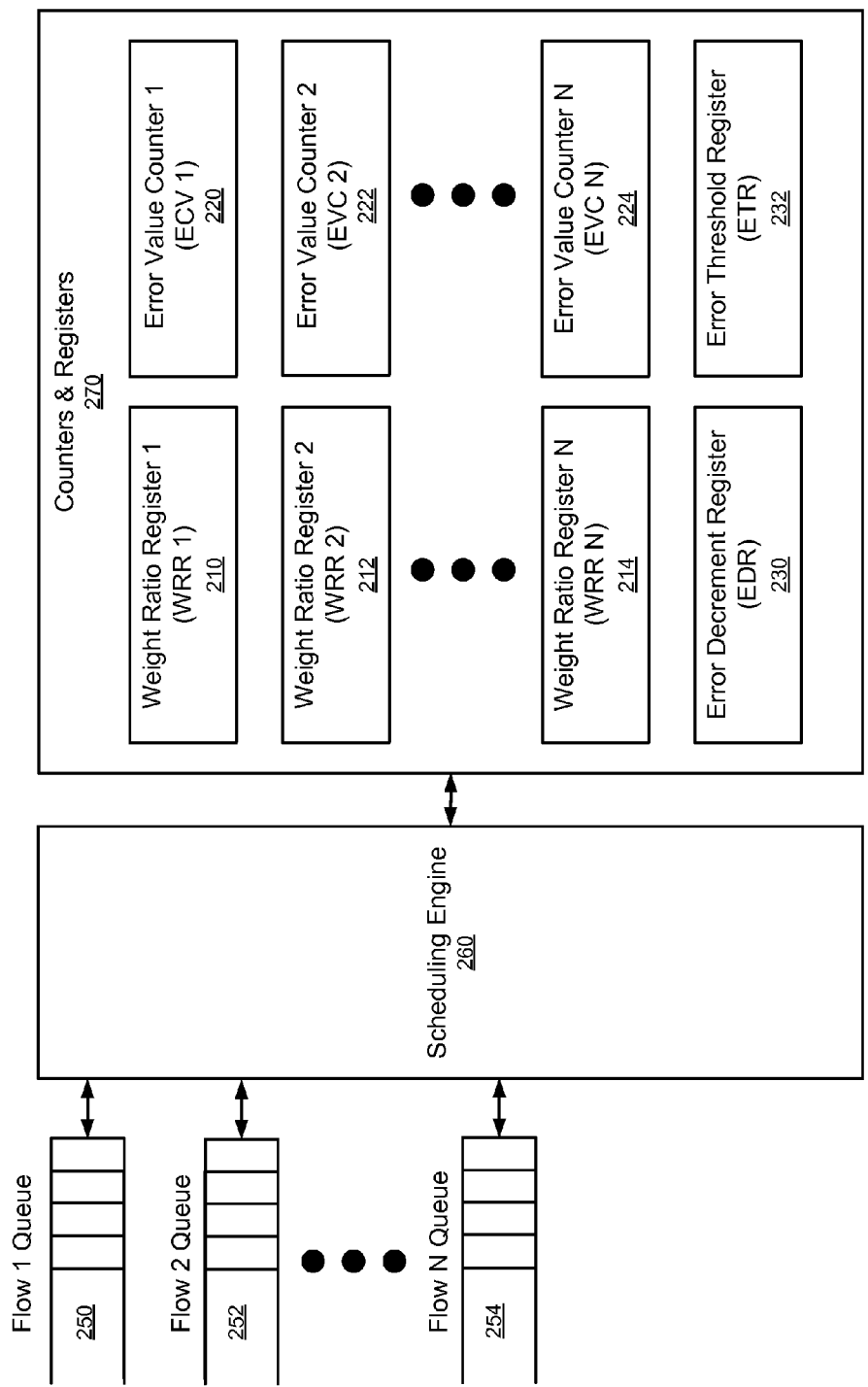
FIG. 2 shows one or more components of the system in FIG. 1, in accordance with one or more embodiments of the invention.

FIG. 2. shows a scheduling engine (260), counters and registers (270), and multiple queues (i.e., flow 1 queue (250), flow 2 queue (252), flow N queue (254)) in accordance with one or more embodiments of the invention. The scheduling engine (260), the counters and registers (270), and the queues (250, 252, 254) are essentially the same as those discussed above in reference to FIG. 1. As shown in FIG. 2, the scheduling engine (260) is operatively connected to the counters and registers (270) and the queues (250, 252, 254).

As shown in FIG. 2, the counters and registers (270) include multiple weight ratio registers (i.e., weight ratio register 1 (WRR 1) (210), weight ratio register 2 (WRR 2) (212), weight ratio register N (WRR N) (214)), multiple error value counters (i.e., error value counter 1 (EVC 1) (220), error value counter 2 (EVC 2) (222), error value counter N (EVC N) (224)), an error decrement register (EDR) (230), and an error threshold register (ETR) (232). Each of the counters and registers (270) is further described below.

In one or more embodiments of the invention, the weight ratio registers (210, 212, 214) are hardware registers, each corresponding to the one of the flows (120, 122, 124 in FIG. 1) arriving at the scheduler (160 in FIG. 1) and further corresponding to one of the flow queues (250, 252, 254). Each weight ratio register may be configured to store a weight ratio of its corresponding flow. For example, WRR 1 (210) may store a weight ratio of flow 1 (120 in FIG. 1) arriving at the flow 1 queue (250) and WRR 2 (212) may store a weight ratio of flow 2 (122 in FIG. 1) arriving at the flow 2 queue (252). In one or more embodiments of the invention, the weight ratio is a ratio between the weight of a particular weight ratio register's corresponding flow and the weights of one or more other flows corresponding to other weight ratio registers. For example, suppose flow 1 (120 in FIG. 1) has weight $W_1$, flow 2 (122 in FIG. 1) has weight $W_2$, flow N (124 in FIG. 1) has weight $W_N$, and flow i (not shown), where $1 \le i \le N$, has weight $W_i$. In one example, WRR i may store the value $$W_i \bigg/ \sum_{j=1, j \ne i}^{N} W_j,$$

which is a quotient of weight $W_i$ divided by the sum of the weights of all other flows excluding $W_i$ (i.e., the sigma notation corresponds to a summation of all weights except $W_i$). In another example, WRR i may store the value $$W_i \bigg/ \sum_{j=1}^{N} W_j,$$

which is a quotient of weight $W_i$ divided by the sum of the weights of the other flows including $W_i$.

In one or more embodiments of the invention, the error value counters (i.e., error value counter 1 (EVC 1) (220), error value counter 2 (EVC 2) (222), error value counter N (EVC N) (224)) are hardware counters, each corresponding to one of the flows (120, 122, 124 in FIG. 1) arriving at the scheduler (160 in FIG. 1) and to one of the queues (250, 252, 254). In one or more embodiments of the invention, each error value counter is configured to store an error value for the corresponding flow and is further configured to decrement the error value by an error decrement value (discussed further below) when a packet from the corresponding flow is forwarded (e.g., EVC 1 is decremented when a packet from flow 1 is forwarded). Further, each error value counter may be configured to increment the error value by a weight ratio of the corresponding flow when a packet from another flow is forwarded. For example, EVC i (not shown), which as discussed above may correspond to an $i^{th}$ error value counter where $1 \le i \le N$, may be decremented by one when a packet from flow i is forwarded. In another example, EVC i may be incremented by the corresponding weight ratio (e.g., a value stored in WRR i) when a packet from flow j is forwarded, where $j \ne i$ (i.e., the packet is forwarded from a different flow than flow i). In one or more embodiments of the invention, if the corresponding queue (e.g., flow i queue (not shown)) is empty, a packet is not forwarded but the corresponding counter (e.g., EVC i) is still decremented. In one or more embodiments of the invention, if the corresponding queue (e.g., flow i queue (not shown)) is empty, a packet is not forwarded and the corresponding counter (e.g., EVC i) is not decremented.

In one or more embodiments of the invention, the error decrement register (230) is a hardware register. The error decrement register (230) may be configured to store an error decrement value used for decrementing the error value counters (220, 222, 224) under the conditions described above. For example, if EDR=1, then each error value counter (220, 222, 224) may be decremented by one when a packet from the corresponding flow is forwarded. In one or more embodiments of the invention, although not shown in FIG. 2, there are multiple error decrement registers and each error decrement register corresponds to one of the flows (120, 122, 124 in FIG. 1) arriving at the scheduler (160 in FIG. 1) and to one of the queues (250, 252, 254). An error value counter (e.g., EVC i) may then be decremented by the error decrement value stored in the corresponding error decrement register (e.g., EDR i (not shown)), which may be different than the error decrement value stored in other error decrement registers.

In one or more embodiments of the invention, the error threshold register (ETR) (232) is a hardware register. The ETR (232) may be configured to store an error threshold that is used for determining whether a packet from one of the flows (120, 122, 124) is to be forwarded. In one or more embodiments of the invention, the error threshold stored in ETR (232) is compared to each of the values in the error value counters (220, 222, 224) to determine whether a packet from the corresponding flow should be forwarded. For example, if ETR (232) stores the value ½, then a packet is forwarded from a flow when the corresponding error value counter of that flow has an error value greater than ½. In one or more embodiments of the invention, although not shown in FIG. 2, there exists multiple error threshold registers and each error threshold register corresponds to one of the flows (120, 122, 124 in FIG. 1) arriving at the scheduler (160 in FIG. 1) and to one of the queues (250, 252, 254). A packet from flow i may be forwarded when the error value in the corresponding error value counter (e.g., EVC i) is greater than the error threshold stored in corresponding error threshold register (ETR i) (not shown), which may be different than the error thresholds stored in other error threshold registers.

Figure 3:
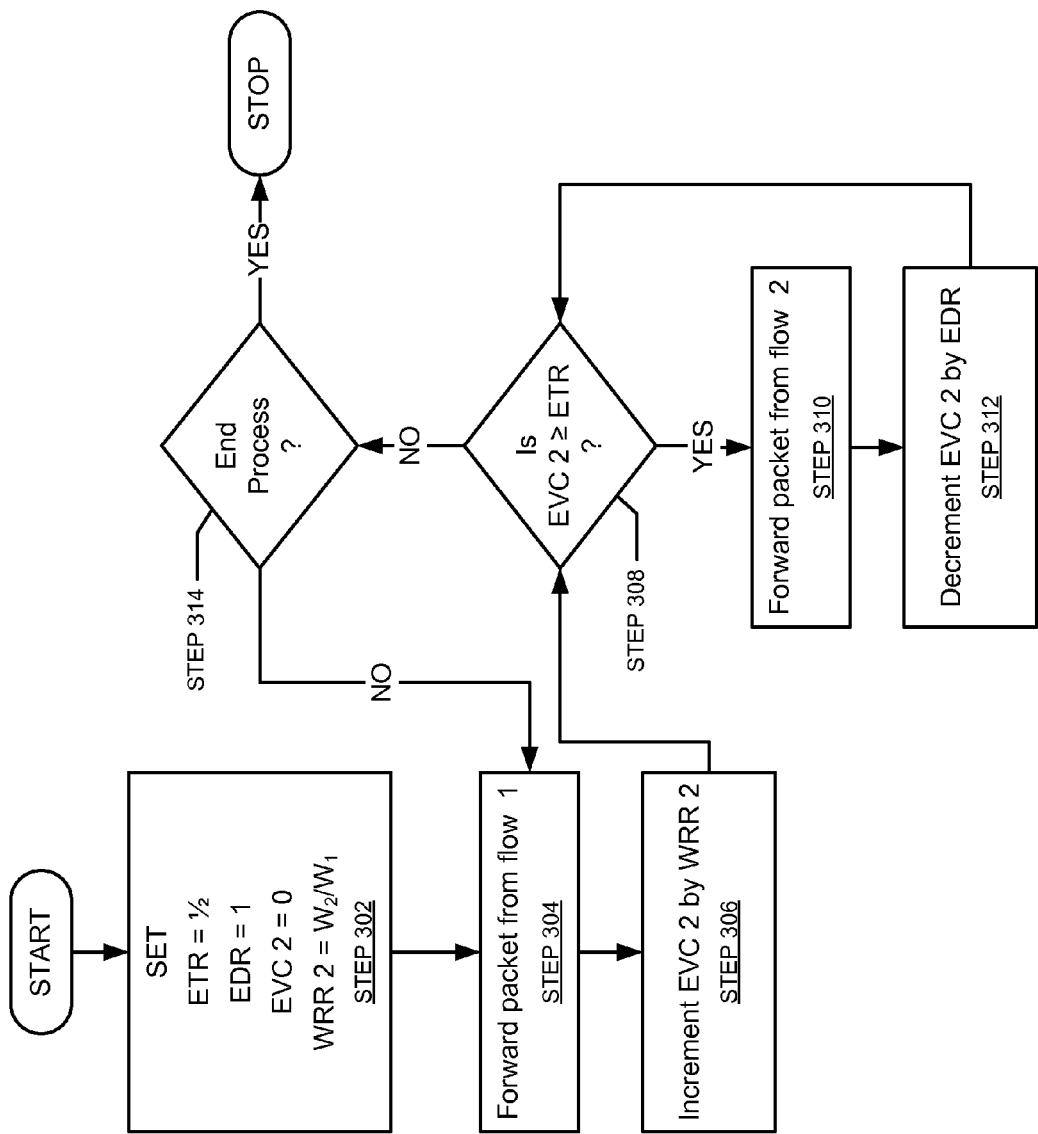
FIGS. 3, 5, and 7 show flowcharts in accordance with one or more embodiments of the invention.

FIG. 3 shows a flowchart in accordance with one or more embodiments of the invention. The process shown in FIG. 3 may be a scheduling algorithm used by a scheduler (e.g., scheduler (160 in FIG. 1)) to store, assemble, and/or forward a sequence of packets from two flows, namely flow 1 having weight $W_1$ and flow 2 having weight $W_2$. Further, the process shown in FIG. 3 may be implemented using one or more components of the system (100 in FIG. 1). Those skilled in the art, having the benefit of this detailed description, will appreciate that the sequence of steps shown in FIG. 3 may differ among embodiments of the invention, that one or more of the steps shown in FIG. 3 may be repeated or omitted, and that one or more steps shown in FIG. 3 may occur in parallel with other steps in FIG. 3.

In one or more embodiments of the invention, the scheduling algorithm in FIG. 3 may set and modify the values of one or more counters (e.g., EVC 1, EVC 2, ... EVC N). In one or more embodiments of the invention, the scheduling algorithm may store calculated values in one or more registers (e.g., WRR 1, WRR 2, ... WRR N, EDR, ETR). In one or more embodiments of the invention, a weight ratio is stored in the WRR 2, an error value is stored in the EVC 2, an error threshold is stored in the ETR, and an error decrement value is stored in the EDR.

Initially, the value of the ETR is set to ½, the value of the EDR is set to one, the value of the EVC 2 is set to zero, and the value of the WRR 2 is set to WRR 2=$W_2/W_1$ (STEP 302). The result of $W_2/W_1$ may be referred to as a weight ratio. In one or more embodiments of the invention, the choice of which weight is used in the numerator of the weight ratio and which weight is used in the denominator of the weight ratio is arbitrary. In one or more embodiments of the invention, the larger of the weights $W_1$ and $W_2$ is used in the numerator of the weight ratio while the smaller weight is used in the denominator of the weight ratio.

After STEP 302, the process proceeds to STEP 304. In STEP 304, a packet from flow 1 is forwarded. As discussed above, forwarding a packet may also refer to storing the packet in a queue to be forwarded later, storing instructions for popping packets from one or more queues, and any other operation on packets that enables scheduling. The process then proceeds to STEP 306. In STEP 306, the EVC 2 is incremented by the value stored in the WRR 2 and the process proceeds to STEP 308. In STEP 308, the EVC 2 is read to determine whether the EVC 2 exceeds or equals the ETR (i.e., ½). When it is determined that the EVC 2 exceeds or equals the ETR (i.e., ½), the process proceeds to STEP 310. Otherwise, when it is determined that the EVC 2 does not exceed or equal the ETR (i.e., ½), the process proceeds to STEP 314.

In STEP 310, a packet from flow 2 is forwarded. The process then proceeds to STEP 312. In STEP 312, EVC 2 is decremented by the EDR (i.e., 1) and the process returns to STEP 308. Those skilled in the art, having the benefit of this detailed description, will appreciate that the process of FIG. 3 continuously repeats STEP 310 and STEP 312 until the condition set forth in STEP 308 is false. Thus, packets from flow 2 are continuously forwarded until the value of the EVC 2 becomes smaller than the ETR (i.e., ½). In one or more embodiments of the invention, on average, the number of packets forwarded from flow 2 for every packet forwarded from flow 1 is equal to the weight ratio (i.e., the value stored in the WRR 2).

After STEP 308, the process returns to STEP 304. Alternatively, execution of the process may be ended (e.g., by a user) (i.e., STEP 314). In one or more embodiments of the invention, STEP 314 is omitted. In such embodiments, STEP 304 is immediately executed following STEP 308 when it is determined that the condition in STEP 308 is false.

In one or more embodiments of the invention, as discussed above, the sequence of steps shown in FIG. 3 can differ among embodiments of the invention. For example, STEP 304 can occur after STEP 308 such that it is no longer necessarily true that the first packet forwarded after STEP 302 will be a packet from flow 1. In another example, EVC 2 incrementing/decrementing steps (i.e., STEP 306 and STEP 312) may be placed before the respective packet forwarding steps (i.e., STEP 304 and STEP 310, respectively).

As discussed above, the number of packets forwarded from flow 2 for each packet forwarded from flow 1 is, on average, equal to the value of WRR 2 (i.e., $W_2/W_1$). These forwarded packets effectively form a sequence of packets. In one or more embodiments of the invention, a jitter of a flow is calculated from the inter departure delays of each packet from each flow in the sequence of packets. An inter departure delay of a packet from flow 1 is equal to a number of positions in the sequence until the next packet from flow 1. Likewise, the inter departure delay of a packet from flow 2 is equal to the number of positions in the sequence until the next packet from flow 2. A calculation of the inter departure delays may be performed on each packet from the sequence after a large number of packets have been forwarded (e.g., the number of packets forwarded is much greater than the sum of the weights of all flows that are scheduled). Those skilled in the art will appreciate that a sequence will repeat (i.e., the sequence will be periodic) every S packets, where S is the sum of all the weights of all flows that are scheduled, if all the weights are natural numbers (i.e., 1, 2, 3 . . . ). If a sequence repeats, a copy of the same sequence may be appended to the back of the original sequence and the resulting sequence can be used for the inter departure delay calculation. For the sequence $P1_1$ $P2_1$ $P2_2$ $P1_2$ $P2_3$ (i.e., $P1_N=N^{th}$ packet from flow 1 and $P2_N=N^{th}$ packet from flow 2), which is the result of scheduling two flows with weights $W_1=2$ and $W_2=3$ with the scheduling algorithm in FIG. 3, the inter departure delay calculation will be performed on $P1_1$ $P2_1$ $P2_2$ $P1_2$ $P2_3$-P1 P2 P2 P1 P2. For example, the first packet from flow 2 (i.e., $P2_1$) is directly next to (i.e., one position away) from a next packet from flow 2 (i.e., $P2_2$), and hence the inter departure delay of the first packet from flow 2 is one. In another example, the second packet from flow 2 (i.e., $P2_2$) is two positions away from the next packet from flow 2 (i.e., $P2_3$), and hence the inter departure delay of the second packet from flow 2 is two. Accordingly, the inter departure delays of flow 2 for the sequence are 1, 2, 2. The jitter of a flow in a sequence is obtained by calculating the standard deviation of its inter departure delays. Accordingly, the jitter of flow 2 is 0.47, whereas the jitter of flow 1 is 0.50.

The scheduling algorithm of FIG. 3 may schedule flow 1 and flow 2 in such a way as to achieve low jitter. Considering again the case where $W_1=2$ and $W_2=3$, a deficit round robin algorithm may produce the repeating sequence $P2_1$ $P2_2$ $P2_3$ $P1_1$ $P1_2$. The jitter for this sequence for flow 1 is 1.5 while for flow 2 it is 0.94. Thus the jitter of flow 1 and flow 2 for a sequence assembled for $W_1=2$ and $W_2=3$ according the scheduling algorithm in FIG. 3 is about 2.5 times lower than the jitter of flow 1 and flow 2 for a sequence assembled for the same weights according to deficit round robin. The scheduling algorithm in FIG. 3, in general, assembles sequences with a lower jitter than those sequences assembled by deficit round robin and several other scheduling algorithms that are well-known by those skilled in the art. Therefore, the scheduling algorithm of FIG. 3 may be preferable from a QoS perspective.

In one or more embodiments of the invention, the value of ½ in the ETR results in low jitter as soon as the process in FIG. 3 forwards the first packet. However, the ETR can be set to any arbitrary number and the scheduling algorithm of FIG. 3 will still eventually generate a low jitter repeating sequence as described above, although the initial few packets forwarded may be solely from flow 1 or flow 2, which results in high jitter for those initial packets. For example, if the ETR is set to ETR=10 instead of ETR=½, then even if WRR 2=1 (i.e., the two weights from flow 1 and flow 2 are equal), ten packets from flow 2 will be forwarded in a row before the process in FIG. 3 converges to forwarding a repeating sequence of P1 P2 (i.e., of one packet forwarded from flow 1 and one packet forwarded from flow 2), as expected when WRR 2=1. Similarly, in STEP 302, EVC 2 can be reset to a value other than zero, resulting in a similar effect as described above. Those skilled in the art, having benefit of this detailed description, will appreciate that the scheduling algorithm presented in FIG. 3 with different values set for the EVC 2 and the ETR is functionally equivalent to the original algorithm presented in FIG. 3.

In one or more embodiments of the invention, some or all of the values (i.e., register values, counter values, etc.) used in the scheduling algorithm in FIG. 3 can be converted into integers without changing the general principle of the scheduling algorithm in FIG. 3. Those skilled in the art, having benefit of this detailed description, will appreciate that computer arithmetic performed using integers may require less hardware resources and/or may be faster than arithmetic performed with non-integers (e.g., floating-point numbers), and thus integer arithmetic is used in hardware components such as NoCs. The scheduling algorithm in FIG. 3 may be converted to contain only integer values and perform only integer arithmetic by multiplying all relevant values by $2W_1$. Specifically, in STEP 302, ETR may be set to $\frac{1}{2} \times 2W_1 = W_1$ instead of $\frac{1}{2}$. Further, EDR may be set to $1 \times 2W_1 = 2W_1$ instead of 1. Further still, WRR 2 may be set to $W_2/W_1 \times 2W_1 = 2W_2$ instead of $W_2/W_1$. Those skilled in the art, having the benefit of this detailed description, will appreciate that as long as the initial weights of the two flows are integers, all relevant values used and calculated by the scheduling algorithm in FIG. 3 may also be integers after the conversion step described above. Further, those skilled in the art will appreciate that the conversion to integer values presented above is only one example and that many other ways of converting the values in FIG. 3 to integers exist.

FIG. 4 shows examples of the scheduling algorithm presented in FIG. 3 (i.e., Example 1 (410)) and (i.e., Example 2 (420)) in accordance with one or more embodiments of the invention. Both examples (410, 420) show the resulting sequence of packets from flow 1 and flow 2 after executing the scheduling algorithm in FIG. 3. As shown in Example 1 (410), the scheduler processes flow 1 having weight $W_1=2$ and flow 2 having weight $W_2=3$. The scheduler sets the ETR to $\frac{1}{2}$, the scheduler sets the EDR to 1, the scheduler initially sets the EVC 2 to zero, and the scheduler sets the WRR 2 to WRR $2=W_2/W_1=1.5$. Now the scheduling algorithm of FIG. 3 will begin to forward packets and modify the error value in the EVC 2 accordingly to obtain a sequence of scheduled packets. The table in Example 1 (410) shows the value of EVC 2 as each packet is forwarded. The resulting sequence of packets is: P1 P2 P2 P1 P2. Those skilled in the art, having the benefit of this detailed description, will appreciate that the sequence P1 P2 P2 P1 P2 continuously repeats as the value of the EVC 2 returns to 0 after the fifth packet is forwarded, which is effectively the same state as the scheduling algorithm started in. The inter departure delays of flow 1 for the resulting sequence in Example 1 (410) are 3 and 2 while the inter departure delays of flow 2 for the resulting sequence in Example 1 (410) are 1, 2, and 2. The jitter of flow 1 is 0.50, whereas the jitter of flow 2 is 0.47.

As shown in Example 2 (420), the scheduler processes flow 1 having weight $W_1=2$ and flow 2 having weight $W_2=3$ according to the scheduling algorithm described in FIG. 3 but now using integer values which are obtained by multiplying the ETR, EDR, and WRR 2 by $2W_1$. Accordingly, the scheduler sets the ETR to ETR=$W_1=2$, and the scheduler sets the EDR to EDR=$2W_1=4$, the scheduler initially sets the EVC 2 to zero, and the scheduler sets the WRR 2 to WRR $2=2W_2=6$. Now the scheduling algorithm of FIG. 3 will begin to forward packets and modify the value of the EVC 2 accordingly to obtain a sequence of scheduled packets. The table in Example 2 (420) shows the value of EVC 2 as each packet is forwarded. As in Example 1 (410), the resulting sequence of packets in Example 2 (420) is also P1 P2 P2 P1 P2. Those skilled in the art, having the benefit of this detailed description, will appreciate that the sequence P1 P2 P2 P1 P2 continuously repeats as the value of the EVC 2 returns to 0 after the fifth packet is forwarded, which is effectively the same state as the scheduling algorithm in Example 2 (420) started in. The inter departure delays of flow 1 for the resulting sequence in Example 2 (420) are 3 and 2 while the inter departure delays of flow 2 for the resulting sequence in Example 2 (420) are 1, 2, and 2, which is the same as in Example 1 (410). Likewise, in Example 2 (420), the jitter of flow 1 is 0.50, whereas the jitter of flow 2 is 0.47.

Figure 5:
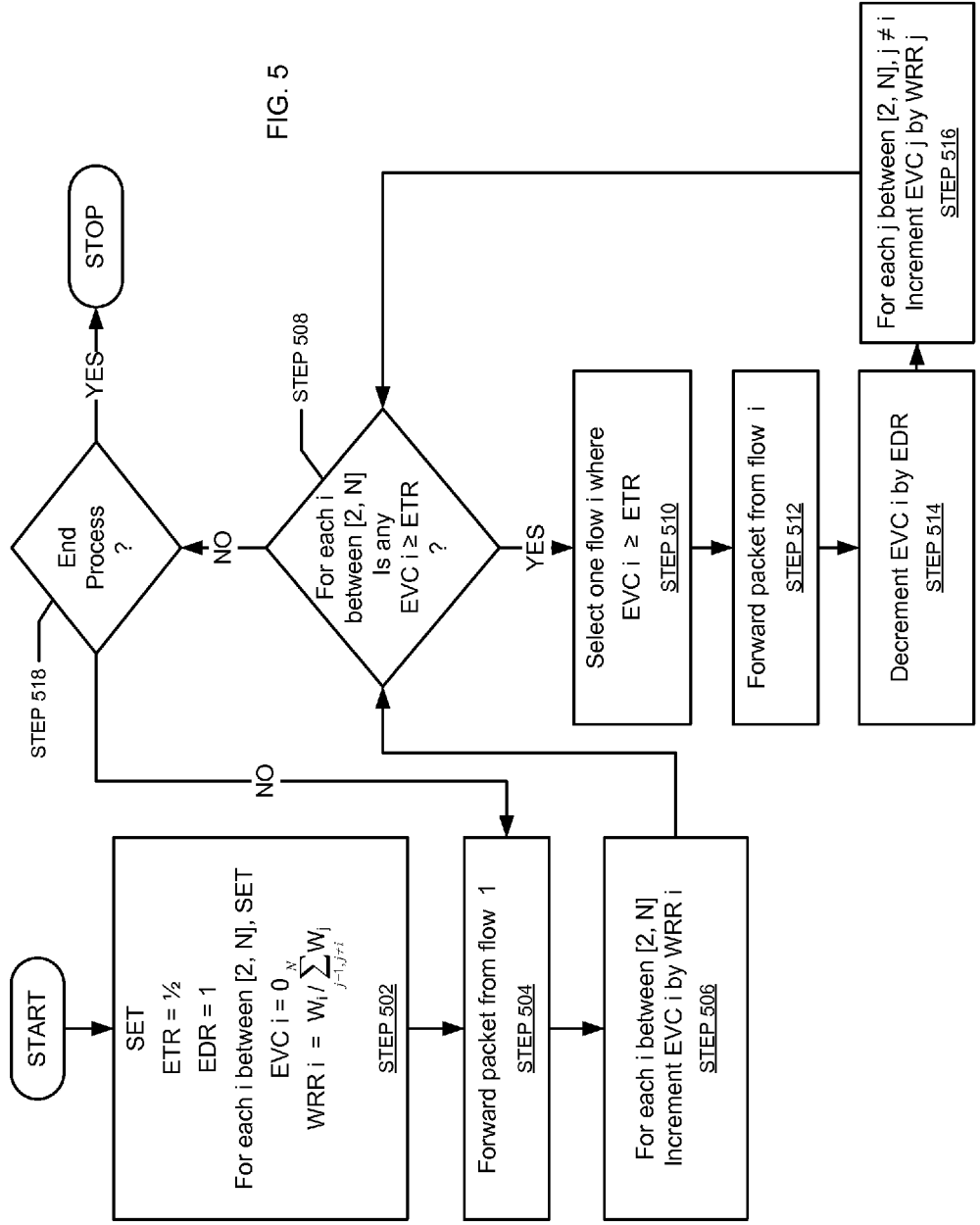

FIG. 5 shows a flowchart in accordance with one or more embodiments of the invention. The process shown in FIG. 5 may be a scheduling algorithm used by a scheduler (e.g., scheduler (160 in FIG. 1)) to store, assemble, and/or forward a sequence of packets from N flows, namely flow 1 having weight $W_1$ through flow N having weight $W_N$. Further, the process shown in FIG. 5 may be implemented using one or more components of the system (100 in FIG. 1). In one or more embodiments of the invention, the process shown in FIG. 5 may be an extension of the process described in FIG. 3 for scheduling more than two flows in parallel. Those skilled in the art, having the benefit of this detailed description, will appreciate that the sequence of steps shown in FIG. 5 may differ among embodiments of the invention, that one or more of the steps shown in FIG. 5 may be repeated or omitted, and that one or more steps shown in FIG. 5 may occur in parallel with other steps in FIG. 5. Further, those skilled in the art will appreciate that any modifications and alternative embodiments described in reference to the process in FIG. 3, as well as any of the advantages described in reference to the process in FIG. 3, may also be applicable to the process in FIG. 5.

In one or more embodiments of the invention, the scheduling algorithm in FIG. 5 may set and modify the values of one or more counters (e.g., EVC 1, EVC 2, . . . EVC N). In one or more embodiments of the invention, the scheduling algorithm may store calculated values in one or more registers (e.g., WRR 1, WRR 2, . . . WRR N, EDR, ETR). In one or more embodiments of the invention, a weight ratio corresponding to the $i^{th}$ flow is stored in the WRR i, an error value corresponding to the $i^{th}$ flow is stored in the EVC i, an error threshold is stored in the ETR, and an error decrement value is stored in the EDR.

In STEP 502, the value of the ETR is set to $\frac{1}{2}$ and the value of the EDR is set to 1. Further, for each flow i between 2 and N (i.e., flow 2, flow 3, . . . flow N−1, flow N), each EVC i is set to 0 (i.e., EVC 2=0, EVC 3=0, EVC N−1=0, EVC N=0). Further still, each WRR i is set to $$W_i \bigg/ \sum_{j=1, j \neq i}^{N} W_j,$$

which is the quotient of weight $W_i$ divided by the sum of the weights of all other flows excluding $W_i$, also referred to as the $i^{th}$ modified sum of weights. For example, WRR 2 may be set to $W_2/(W_1+W_3+\ldots W_{N-1}+W_N)$ whereas WRR N may be set to $W_N/(W_1+W_2+\ldots W_{N-2}+W_{N-1})$. Each result of $$W_i \bigg/ \sum_{j=1, j \neq i}^{N} W_j$$

for each i may be referred to as a weight ratio of the $i^{th}$ flow. As seen in FIG. 5, a weight ratio and error value of one of the flows (i.e., WRR 1 and EVC 1 for flow 1 in the particular embodiment in FIG. 5) are not calculated or used. In one or more embodiments of the invention, the choice of which weight ratio and error value are not calculated or used is arbitrary. In one or more embodiments of the invention, the flow with the lowest weight of $W_1 \ldots W_N$ has no stored or calculated error value and weight ratio. In one or more embodiments of the invention, each WRR i is instead set to $W_i/W_1$. When WRR i equals to $W_i/W_1$, the EDR may need to be modified appropriately (e.g., the EDR may be set to a number greater than 1).

After STEP 502, the process proceeds to STEP 504. In STEP 504, a packet from flow 1 is forwarded. As discussed above, the packet forwarded in STEP 504 may correspond to the flow for which an error value and weight ratio is not calculated or used. The process then proceeds to STEP 506. In STEP 506, each EVC i for 2≤i≤N is incremented by the value stored in the corresponding WRR i. For example, EVC 2 is incremented by WRR 2 while EVC N is incremented by WRR N. The process then proceeds to STEP 508. In STEP 508, each EVC i is read to determine whether any EVC i exceeds or equals the ETR (i.e., ½). When it is determined that at least one of the EVC i exceeds or equals the ETR (i.e., ½), the process proceeds to STEP 510. Otherwise, when it is determined that none of the EVC i exceed or equal the ETR (i.e., ½), the process proceeds to STEP 518. For example, if EVC 2=1, the process proceeds to STEP 510, but if for all i, EVC i=0, the process proceeds to STEP 518.

In STEP 510, one of the flows (i.e., flow i) between flow 2 and flow N is selected that has an EVC i greater than or equal to the ETR (i.e., ½). In one or more embodiments of the invention, the flow that meets the condition in STEP 508 is selected arbitrarily from all the other flows that also meet the condition in STEP 508. In one or more embodiments of the invention, the flow that meets the condition in STEP 508 is selected in either descending or ascending numerical order (e.g., flow 2 is selected first and flow 3 is selected next) from all the flows that meet the condition in STEP 508. In one or more embodiments of the invention, the flow that meets the condition in STEP 508 is selected based on the corresponding error value and the error values of the other flows. For example, the flow with the highest error value (i.e., that has the highest value stored in the error value counter) may be selected. This may lead to a lower jitter of the resulting sequence of scheduled packets than the jitter of a sequence obtained by arbitrarily or sequentially choosing one of the flows that meet the condition of STEP 508.

In STEP 512, after one flow (i.e., flow i) is selected in STEP 510, a packet from flow i is forwarded. The process then proceeds to STEP 514. In STEP 514, EVC i is decremented by the EDR (i.e., 1), and the process proceeds to STEP 516. In STEP 516, the error value counter of each flow except flow i (i.e., EVC j for each j between 2 and N, where j≠i), is incremented by the corresponding weight ratio (i.e., WRR j). For example, EVC 2, assuming i≠2 in this case, is incremented by WRR 2, while EVC N, assuming i≠N, is incremented by WRR N. After STEP 516, the process returns to STEP 508. Those skilled in the art, having the benefit of this detailed description, will appreciate that the process of FIG. 5 continuously repeats STEP 510, STEP 512, STEP 514, and STEP 516 until the condition set forth in STEP 508 is false. Thus, packets from the flows that have an error value exceeding the ETR will be forwarded until all the error values are below the ETR (i.e., ½). In one or more embodiments of the invention, on average, the number of packets forwarded from flow i for every packet forwarded from the other flows is equal to the corresponding weight ratio of flow i (i.e., the value stored in the WRR i).

After STEP 508, the process returns to STEP 504. Alternatively, execution of the process may be ended (e.g., by a user) (i.e., STEP 518). In one or more embodiments of the invention, STEP 518 is omitted. In such embodiments, STEP 504 is immediately executed following STEP 508 if the condition in STEP 508 is false.

As discussed above, several schedulers, each capable of only scheduling two flows, may be stacked end-to-end in order to schedule more than two flows. For example, the resulting sequence obtained by scheduling flow 1 and flow 2 with the scheduling algorithm of FIG. 3 can be inputted, along with a third flow (e.g., flow 3), into another scheduler performing the process of FIG. 3. The final resulting sequence from the second scheduler would be a low jitter sequence for all three flows. Those skilled in the art, having the benefit of this detailed description, will appreciate that this method of scheduling flows leads to high latency as multiple scheduling events from multiple schedulers take place in series (i.e., one after another). In contrast, the scheduling algorithm presented in FIG. 5 may schedule multiple flows in parallel using essentially the same principles as the scheduling algorithm in FIG. 3.

Similarly to the discussion in reference to FIG. 3, some or all values (i.e., register values, counter values) used in the scheduling algorithm of FIG. 5 may be converted into integers without changing the general principle of the scheduling algorithm in FIG. 5. The scheduling algorithm in FIG. 5 may be converted to contain only integer values and perform only integer arithmetic by multiplying all relevant values by $$2\prod_{k=2}^{N}\left[\sum_{j=1,j\neq k}^{N}W_j\right],$$

which is two times the product of all modified sums of weights except the first modified sum of weights (i.e., the pi notation corresponds to a product of modified sums). As discussed above, the $i^{th}$ modified sum of weights is a sum of the weights of all flows except the $i^{th}$ flow (i.e., $W_1+W_2+\ldots W_{i-1}+W_{i+1}+\ldots W_{N-1}+W_N$). For example, if the scheduler schedules three flows with weights $W_1$, $W_2$, and $W_3$, the first modified sum is $W_2+W_3$, the second modified sum is $W_1+W_3$, and the third modified sum is $W_1+W_2$. Accordingly, the product of the modified sums is $(W_2+W_3)\times(W_1+W_3)\times(W_1+W_2)$. Going back to the general case, in STEP 502, the ETR may be set to $$\frac{1}{2}\times 2\prod_{k=2}^{N}\left[\sum_{j=1,j\neq k}^{N}W_j\right]=\prod_{k=2}^{N}\left[\sum_{j=1,j\neq k}^{N}W_j\right]$$

instead of ½. Further, the EDR may be set to $$1\times 2\prod_{k=2}^{N}\left[\sum_{j=1,j\neq k}^{N}W_j\right]=2\prod_{k=2}^{N}\left[\sum_{j=1,j\neq k}^{N}W_j\right]$$

instead of 1. Further still, each WRR i for 2≤i≤N may be set to $$W_i \Big/ \sum_{j=1,j\neq i}^{N} W_j \times 2 \prod_{k=2}^{N}\left[\sum_{j=1,j\neq k}^{N} W_j\right] = 2W_i \prod_{k=2,k\neq i}^{N}\left[\sum_{j=1,j\neq k}^{N} W_j\right]$$

instead of $$W_i \Big/ \sum_{j=1,j\neq i}^{N} W_j,$$

which stands for two times the product of $W_i$ and all modified sums of weights except the first modified sum and the $i^{th}$ modified sum. For example, for the three weights introduced above, WRR 2 may be set to WRR $2=[W_2/(W_1+W_3)]\times[2\times(W_1+W_3)\times(W_1+W_2)]=2W_1\times(W_1+W_2)$. Those skilled in the art, having the benefit of this detailed description, will appreciate that since a product of modified sums is a common multiple of each modified sum, then as long as the weights of each flow are integers, all relevant values used and calculated by the scheduling algorithm in FIG. 5 may also be integers after the conversion described above. Further, those skilled in the art, having the benefit of this detail description, will appreciate that any of the values discussed above, such as each modified sum of weights or the product of some or all modified sums of weights, may be calculated only once and stored in a buffer that is accessible for later use. Further still, those skilled in the art will appreciate that the conversion to integer values presented above is only one particular example and that many other ways of converting the values in FIG. 5 to integers exist.

FIG. 6 shows examples of the scheduling algorithm presented in FIG. 5 (i.e., Example 1 (610)) and (i.e., Example 2 (620)) in accordance with one or more embodiments of the invention. Both examples (610, 620) show the resulting sequence of packets from three flows (i.e., flow 1, flow 2, and flow 3) after executing the scheduling algorithm in FIG. 5. As shown in Example 1 (610), the scheduler processes flow 1 having weight $W_1=2$, flow 2 having weight $W_2=3$, and flow 3 having weight $W_3=5$. The scheduler sets the ETR to IA, the scheduler sets the EDR to 1, the scheduler initially sets EVC 2 and EVC 3 to zero, and the scheduler sets the WRR 2 to WRR $2=W_2/(W_1+W_3)=3/(2+5)=3/7$, and the scheduler sets the WRR 3 to WRR $3=W_3/(W_1+W_2)=5/(2+3)=1$. Now the scheduling algorithm of FIG. 5 will begin to forward packets and modify the values of the EVC 2 and the EVC 3 accordingly to obtain a scheduled sequence of packets. The table in Example 1 (610) shows the value of EVC 2 and the value of the EVC 3 as each packet is forwarded. The resulting sequence of packets is: P1 P3 P2 P3 P1 P2 P3 P3 P2 P3. Those skilled in the art, having the benefit of this detailed description, will appreciate that the sequence P1 P3 P2 P3 P1 P2 P3 P3 P2 P3 continuously repeats as the value of the EVC 2 and EVC 3 both return to 0 after the tenth packet is forwarded, which is effectively the same state as the scheduling algorithm started in. The inter departure delays of flow 1 for the resulting sequence in Example 1 (610) are 4 and 6, the inter departure delays of flow 2 for the resulting sequence are 3, 3, and 4, and the inter departure delays for flow 3 for the resulting sequence are 2, 3, 1, 2, and 2. The jitter of flow 1 is 1, the jitter for flow 2 is 0.47, and the jitter of flow 3 is 0.63.

As shown in Example 2 (620), the scheduler processes flow 1 having weight $W_1=2$, flow 2 having weight $W_2=3$, and flow 3 having weight $W_3=5$ according to the scheduling algorithm described in FIG. 5, but now using integer values which are obtained by multiplying the ETR, EDR, WRR 2, and WRR 3 by $2\times(W_1+W_3)\times(W_1+W_2)$, which is the two times the product of the second modified sum and the third modified sum (i.e., all modified sums but the first modified sum). The scheduler sets the ETR to $\frac{1}{2}\times2\times(W_1+W_3)\times(W_1+W_2)=(W_1+W_3)\times(W_1+W_2)=7\times5=35$, the scheduler sets the EDR to $2\times(W_1+W_3)\times(W_1+W_2)=2\times(W_1+W_3)\times(W_1+W_2)=2\times7\times5=70$, the scheduler initially sets the EVC 2 and EVC 3 to zero, the scheduler sets the WRR 2 to WRR $2=W_2\times2\times(W_1+W_2)=6\times5=30$, and the scheduler sets the WRR 3 to WRR $3=W_3\times2\times(W_1+W_3)=10\times7=70$. Now the scheduling algorithm of FIG. 5 will begin to forward packets and modify the values of the EVC 2 and the values of the EVC 3 accordingly to obtain a sequence packets. The table in Example 2 (620) shows the value of EVC 2 and the value of the EVC 3 as each packet is forwarded. The resulting sequence of packets is: P1 P3 P2 P3 P1 P2 P3 P3 P2 P3. Those skilled in the art, having the benefit of this detailed description, will appreciate that the sequence P1 P3 P2 P3 P1 P2 P3 P3 P2 P3 continuously repeats as the value of the EVC 2 and EVC 3 both return to 0 after the tenth packet is forwarded, which is effectively the same state as the scheduling algorithm started in. The inter departure delays of flow 1 for the resulting sequence in Example 2 (620) are 4 and 6, the inter departure delays of flow 2 for the resulting sequence are 3, 3, and 4, and the inter departure delays for flow 3 for the resulting sequence are 2, 3, 1, 2, and 2. The jitter of flow 1 is 1, the jitter for flow 2 is 0.47, and the jitter of flow 3 is 0.63.

Figure 7:
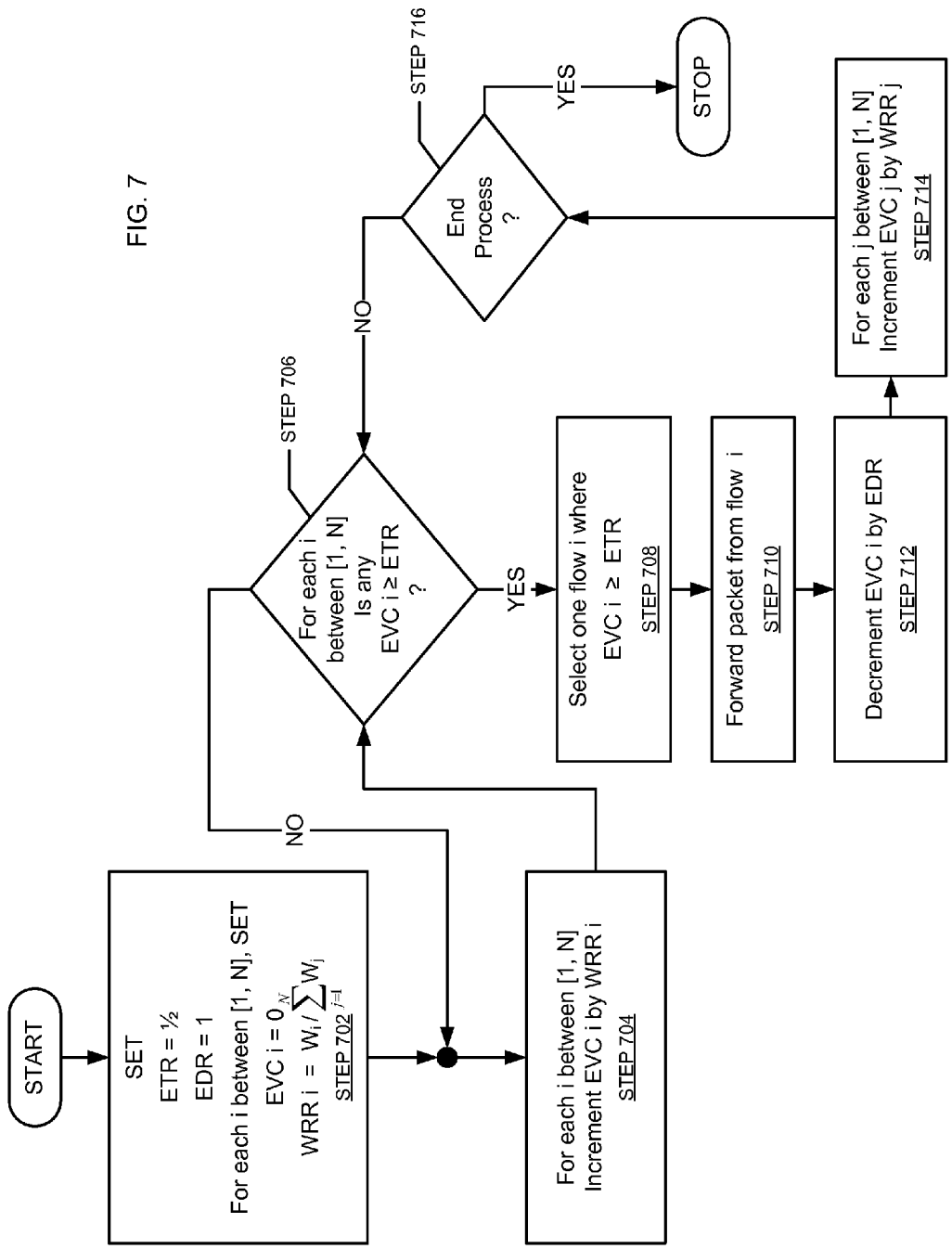

FIG. 7 shows a flowchart in accordance with one or more embodiments of the invention. The process shown in FIG. 7 may be a scheduling algorithm used by a scheduler (e.g., scheduler (160 in FIG. 1)) to store, assemble, and/or forward a sequence of packets from N flows, namely flow 1 having weight $W_1$ through flow N having weight $W_N$. Further, the process shown in FIG. 7 may be implemented using one or more components of the system (100 in FIG. 1). In one or more embodiments of the invention, the process shown in FIG. 7 may be modification of the process described in FIG. 5 and an extension of the process described in FIG. 3 for scheduling more than two flows in parallel. Those skilled in the art, having the benefit of this detailed description, will appreciate that the sequence of steps shown in FIG. 7 may differ among embodiments of the invention, that one or more of the steps shown in FIG. 7 may be repeated or omitted, and that one or more steps shown in FIG. 7 may occur in parallel with other steps in FIG. 7. Further, those skilled in the art will appreciate that any modifications and alternative embodiments described in reference to the process in FIG. 3 and FIG. 5, as well as any of the advantages described in reference to the process in FIG. 3 and FIG. 5 may also be applicable to the process in FIG. 7.

In one or more embodiments of the invention, the scheduling algorithm in FIG. 7 may set and modify the values of one or more counters (e.g., EVC 1, EVC 2, ... EVC N). In one or more embodiments of the invention, the scheduling algorithm may store calculated values in one or more registers (e.g., WRR 1, WRR 2, ... WRR N, EDR, ETR). In one or more embodiments of the invention, a weight ratio corresponding to the $i^{th}$ flow is stored in the WRR i, an error value corresponding to the $i^{th}$ flow is stored in the EVC i, an error threshold is stored in the ETR, and an error decrement value is stored in the EDR.

In STEP 702, the value of the ETR is set to ½ and the value of the EDR is set to 1. Further, for each flow i between 1 and N (i.e., flow 1, flow 2, ... flow N−1, flow N), each EVC i is set to 0 (i.e., EVC 1=0, EVC 2=0, EVC 3=0, ... EVC N−1=0, EVC N=0). Further still, each WRR i is set to $$W_i \bigg/ \sum_{j=1}^{N} W_j,$$

which is the quotient of weight $W_i$ divided by the sum of the weights of all flows including $W_i$. For example, WRR 2 may be set to $W_2/(W_1+W_2+\ldots W_{N-1}+W_N)$ whereas WRR N may be set to $W_N/(W_1+W_2 \ldots W_{N-1}+W_N)$. Each result of $$W_i \bigg/ \sum_{j=1}^{N} W_j$$

for each flow i may be referred to as a weight ratio corresponding to that flow i.

After STEP 702, the process proceeds to STEP 704. In STEP 704, each EVC i for $1 \leq i \leq N$ is incremented by the value stored in the corresponding WRR i. For example, EVC 1 is incremented by WRR 1 while EVC N is incremented by WRR N. The process then proceeds to STEP 706. In STEP 706, each EVC i is read to determine whether any EVC i exceeds or equals the ETR (i.e., ½). When it is determined that at least one of the EVC i exceeds or equals the ETR (i.e., ½), the process proceeds to STEP 708. Otherwise, when it is determined that none of the EVC i exceed or equal the ETR (i.e., ½), the process proceeds to STEP 716. For example, if EVC 2=1, the process proceeds to STEP 708, but if for all i, EVC i=0, the process proceeds to STEP 716.

In STEP 708, one of the flows (e.g., flow i) between flow 1 and flow N is selected that has an EVC i greater than or equal to the ETR. In one or more embodiments of the invention, the flow that meets the condition in STEP 706 is selected arbitrarily from all the other flows that also meet the condition in STEP 706. In one or more embodiments of the invention, the flow that meets the condition in STEP 706 is selected in either descending or ascending numerical order (e.g., flow 1 is selected first and flow 2 is selected next) from all the flows that meet the condition in STEP 706. In one or more embodiments of the invention, the flow that meets the condition in STEP 706 is selected based on the corresponding error value and the error values of the other flows. For example, the flow with the highest error value (i.e., that has the highest value of the error value counter) may be selected. This may lead to a lower jitter of the resulting sequence of scheduled packets than the jitter of a sequence obtained by arbitrarily or sequentially choosing one of the flows that meet the condition of STEP 706

In STEP 710, after a flow i is selected in STEP 708, a packet from flow i is forwarded. The process then proceeds to STEP 712. In STEP 712, EVC i is decremented by the EDR (i.e., 1), and the process proceeds to STEP 714. In STEP 714, the error value counter of each flow (i.e., EVC j for each j between 1 and N, including EVC i), is incremented by the corresponding weight ratio (i.e., WRR j). For example, EVC 2 is incremented by WRR 2 while EVC N is incremented by WRR N. After STEP 714, the process returns to STEP 706. Alternatively, execution of the process may be ended (e.g., by a user) (i.e., STEP 716). In one or more embodiments of the invention, STEP 716 is omitted. In such embodiments, STEP 708 is immediately executed following STEP 714 if the condition in STEP 706 is true. Those skilled in the art, having the benefit of this detailed description, will appreciate that the process of FIG. 7 continuously repeats STEP 708, STEP 710, STEP 712, and STEP 714 as long as the condition set forth in STEP 706 is true. Further, those skilled in the art will appreciate that once the condition in STEP 706 is true, the condition in STEP 706 remains true indefinitely (i.e., at least one EVC i remains greater than the ETR). In one or more embodiments of the invention, on average, the number of packets forwarded from flow i for every packet forwarded from all flows (including flow i) is equal to the corresponding weight ratio of flow i (i.e., the value stored in the WRR i). For some weight ratios, the scheduling algorithm of FIG. 7 may first produce a pre-sequence before forwarding a repeating sequence of packets.

Similarly to the discussion in reference to FIG. 3 and FIG. 5, some or all values (i.e., register values, counter values) used in the scheduling algorithm of FIG. 7 may be converted into integers without changing the general principle of the scheduling algorithm in FIG. 7. The scheduling algorithm in FIG. 7 may be converted to contain only integer values and perform only integer arithmetic by multiplying all relevant values by $$2 \sum_{j=1}^{N} W_j,$$

which is two times the sum of the weights of all flows scheduled by the scheduler. Thus, in STEP 702, the ETR may be set to $$\frac{1}{2} \times 2 \sum_{j=1}^{N} W_j = \sum_{j=1}^{N} W_j$$

instead of ½. Further, the EDR may be set to $$1 \times 2 \sum_{j=1}^{N} W_j = 2 \sum_{j=1}^{N} W_j$$

instead of 1. Further still, each WRR i for $1 \leq i \leq N$ may be set to $$W_i \bigg/ \sum_{j=1}^{N} W_j \times 2 \sum_{j=1}^{N} W_j = 2 W_i$$

instead of $$W_i \bigg/ \sum_{j=1}^{N} W_j.$$

Those skilled in the art, having the benefit of this detailed description, will appreciate that as long as the weights of each flow are integers, all relevant values used and calculated by the scheduling algorithm in FIG. 7 may also be integers after the conversion steps described above. Further, those skilled in the art, having the benefit of this detail description, will appreciate that any of the values discussed above, such as the sum of the weights, may be calculated only once and stored in a buffer for later use. Further still, those skilled in the art will appreciate that the conversion to integer values presented above is only one example and that many other ways of converting the values in FIG. 7 to integers exist.

Those skilled in the art, having the benefit of this detailed description, will appreciate that because each weight ratio in the scheduling algorithm in FIG. 7 has the same denominator (i.e., the denominator is the sum of all weights), that unlike in the scheduling algorithm in FIG. 5 where each denominator of each weight ratio is different, it is generally easier (e.g., faster, requires less hardware resources) to convert the values used in the scheduling algorithm in FIG. 7 to integers than to convert the values used in the scheduling algorithm in FIG. 5 to integers. As discussed above, converting the relevant values to integers for the scheduling algorithm in FIG. 5 requires multiplying by a product of nearly all of the modified sums of weights. Those skilled in the art will appreciate that this process is computationally expensive as it may require approximately N−1 additions and approximately N−2 multiplications. Further, those skilled in the art will appreciate that it may be difficult to store the product of modified sums of weights as this number may be very large (e.g., for ten flows with each flow having a weight between 1-10, on average, the product of modified sums will be larger than the maximum integer value that can be stored in a 32 bit register). On the other hand, the process in FIG. 5 requires one less computation for each loop than the process in FIG. 7 as one of the error value counters (e.g., EVC 1) and weight ratio registers (e.g., WRR 1) is not used. Thus, depending on the application and the resources available, it may be preferable to use either the scheduling algorithm in FIG. 5 or the scheduling algorithm of FIG. 7 in an implementation of the scheduler.

FIG. 8 shows examples of the scheduling algorithm presented in FIG. 7 (i.e., Example 1 (810)) and (i.e., Example 2 (820)) in accordance with one or more embodiments of the invention. Both examples (810, 820) show the resulting sequence of packets from three flows (i.e., flow 1, flow 2, and flow 3) after executing the scheduling algorithm in FIG. 7. As shown in Example 1 (810), the scheduler processes flow 1 having weight $W_1=2$, flow 2 having weight $W_2=3$, and flow 3 having weight $W_3=5$. The scheduler sets the ETR to ½, the scheduler sets the EDR to 1, the scheduler initially sets EVC 1, EVC 2, and EVC 3 to zero, and the scheduler sets the WRR 1 to WRR $1=W_1/(W_1+W_2+W_3)=2/(2+3+5)=⅕$, the scheduler sets the WRR 2 to WRR $2=W_2/(W_2+W_2+W_3)=3/(2+3+5)=3/10$, and the scheduler sets the WRR 3 to WRR $3=W_3/(W_1+W_2+W_3)=5/(2+3+5)=½$. Now the scheduling algorithm of FIG. 7 will begin to forward packets and modify the values of the EVC 1, the EVC 2, and the EVC 3 accordingly to obtain a scheduled sequence packets. The table in Example 1 (810) shows the value of the EVC 1, the value of the EVC 2, and the value of the EVC 3 as each packet is forwarded. The resulting sequence of packets is: P3 P2 P1 P3 P2 P3 P3 P1 P2 P3. Those skilled in the art, having the benefit of this detailed description, will appreciate that the sequence P3 P2 P1 P3 P2 P3 P3 P1 P2 P3 continuously repeats as the value of the EVC 1, the EVC 2, and the EVC 3 return to ⅕, 3/10, and ⅕, respectively, after the tenth packet is forwarded, which is effectively the same state as the scheduling algorithm started in. The inter departure delays of flow 1 for the resulting sequence in Example 1 (810) are 5 and 5, the inter departure delays of flow 2 for the resulting sequence are 3, 4, and 3, and the inter departure delays for flow 3 for the resulting sequence are 3, 2, 1, 3, and 1. The jitter of flow 1 is 0, the jitter for flow 2 is 0.47, and the jitter of flow 3 is 0.89.

As shown in Example 2 (820), the scheduler processes flow 1 having weight $W_1=2$, flow 2 having weight $W_2=3$, and flow 3 having weight $W_3=5$ according to the scheduling algorithm described in FIG. 7 but now using integer values which are obtained by multiplying the ETR, EDR, WRR 1, WRR 2, and WRR 3 by $2\times(W_1+W_2+W_3)=20$. The scheduler sets the ETR to $½\times2\times(W_1+W_2+W_3)=10$, the scheduler sets the EDR to $2\times(W_1+W_2+W_3)=20$, the scheduler initially sets the EVC 1, EVC 2, and EVC 3 to zero, the scheduler sets the WRR 1 to WRR $1=2W_1=4$, the scheduler sets the WRR 2 to WRR $2=2W_2=6$, and the scheduler sets the WRR 3 to WRR $3=2W_3=10$. Now the scheduling algorithm of FIG. 7 will begin to forward packets and modify the value of the EVC 1, the value of the EVC 2, and the value of the EVC 3 accordingly to obtain a sequence packets. The table in Example 2 (820) shows the value of the EVC 1, the value of the EVC 2, and the value of the EVC 3 as each packet is forwarded. The resulting sequence of packets is: P3 P2 P1 P3 P2 P3 P3 P1 P2 P3. Those skilled in the art, having the benefit of this detailed description, will appreciate that the sequence P3 P2 P1 P3 P2 P3 P3 P1 P2 P3 continuously repeats as the value of the EVC 1, the EVC 2, and the EVC 3 return to 4, 6, and 10, respectively, after the tenth packet is forwarded, which is effectively the same state as the scheduling algorithm started in. The inter departure delays of flow 1 for the resulting sequence in Example 2 (820) are 5 and 5, the inter departure delays of flow 2 for the resulting sequence are 3, 4, and 3, and the inter departure delays for flow 3 for the resulting sequence are 3, 2, 1, 3, and 1. The jitter of flow 1 is 0, the jitter for flow 2 is 0.47, and the jitter of flow 3 is 0.89.

Those skilled in the art, having the benefit of this detailed description, will appreciate that the scheduling algorithms presented in FIG. 3, FIG. 5, and FIG. 7 may be modified by several simple arithmetic operations (e.g., multiplication of one or more values by a constant, addition of a constant to one or more values, inversion of one or more values, and other simple mathematical operations). For example, the register and counter values of the scheduling algorithms presented in FIG. 3, FIG. 5, and FIG. 7 may be multiplied by a constant, which may lead to different values for all registers and counters but result in the same sequence of packets forwarded as the original scheduling algorithms. Those skilled in the art will appreciate that it is also trivial to invert some or all of the values used in the scheduling algorithms described above such that one or more steps involving incrementing/decrementing will be reversed (i.e., incrementing steps may be changed to decrementing steps and vice-versa). For example, if the error decrement register stores the value negative one (i.e., −1) instead of one, the steps involving decrementing an error value counter by the EDR in the scheduling algorithms of FIG. 3, FIG. 5, and FIG. 7 should be changed to incrementing steps to maintain correct scheduling behavior.

Those skilled in the art, having the benefit of this detailed description, will appreciate the scheduling algorithms of FIG. 3, FIG. 5, and FIG. 7 may schedule a flow only once, thus performing the associated calculations only once. Once a repeating sequence of scheduled packets is forwarded or assembled, the sequence may be stored in a buffer and subsequent packets from a flow may be forwarded according to the sequence stored in the buffer. In one or more embodiments of the invention, some or all of the calculations performed by the scheduling algorithm of FIG. 3, FIG. 5, and FIG. 7 are pre-calculated before packets from some or all flows (e.g., 120, 122, 124 in FIG. 1) arrive at the scheduler. In one or more embodiments of the invention, the sequences for various weight combinations are pre-calculated (e.g., by a hardware processor external to the scheduler) and stored in a buffer (e.g., as vectors/arrays in a repository external to the scheduler) to be later accessed or loaded (e.g., into a buffer in the scheduler) when flows arrive at the scheduler. Pre-calculated sequences for a subset of weight combinations stored in an external repository may be loaded into a buffer within the scheduler depending on the expected weight ranges of packet sources the scheduler is to schedule.

In many cases, the scheduling algorithm presented in FIG. 3, FIG. 5, and FIG. 7 may have at least one flow that does not contain packets to be forwarded (e.g., the queue corresponding to the flow is empty or the corresponding packet source stops sending packets). In one or more embodiments of the invention, when this condition occurs, the scheduling algorithm temporarily suspends computation (i.e., remains in one of the steps in FIG. 3, FIG. 5, or FIG. 7 without advancing to the next step) and retains all stored values (e.g., ETR, EDR, WRR 1 ... WRR N, EVC 1 ... EVC N). The scheduler may resume computation once the flow in question has packets to be forwarded. For example, if in STEP 310 of FIG. 3, packet source 2 (i.e., flow 2) has no available packets for scheduling, the process remains in STEP 310 until additional packets are available. In one or more embodiments of the invention, a scheduling algorithm proceeds whether or not any or all flows contain packets to be forwarded. Using the same example, STEP 310 is effectively skipped when there are no available packets from packet source 2 (i.e., flow 2) and the process in FIG. 3 immediately proceeds to STEP 312.

Those skilled in the art, having the benefit of this detailed description, will appreciate that the scheduling algorithms described in reference to FIG. 3, FIG. 5, and FIG. 7 are not limited to scheduling network packets. A packet may refer to any discrete set of data at least one bit wide (e.g., a network packet, a packet identifier, a process identifier, a thread identifier, an integer, a Boolean, and any other discrete data type). Forwarding a packet is not limited to sending a packet to another destination external to the scheduler. In one or more embodiments of the invention, forwarding a packet may include storing a packet (e.g., a process identifier) in a queue (i.e., forwarding the packet to a queue), where the queue (e.g., register, register file, RAM, flash, processor cache, and any other temporary or permanent storage) is internal or external to the scheduler. In one or more embodiments of the invention, this queue may be accessed to assign time slots for several resource requesters (e.g., software application threads, operating system processes, and other processes requiring resources) to a limited resource (e.g., processor, memory, storage, or any other limited resource). In such embodiments, packet sources may be resource requestors while weights and weight ratios may correspond to the relative amounts of time (e.g., time slots, priority levels, etc.) that a resource requestor is assigned for a resource. For example, the sequence P2 P1 P1 P2 P1 may correspond to a software application thread 2 obtaining control of a processor for one time slot (i.e., for the first time slot), software application thread 1 obtaining control of the processor for two time slots (i.e., for the second and third time slot), software application thread 2 again obtaining control of the processor for one time slot (i.e., for the fourth time slot), and software application thread 1 again obtaining control of the processor for one time slot (i.e., for the fifth time slot). Those skilled in the art will appreciate that the advantages of the scheduling algorithms described above with respect to jitter are also relevant for embodiments related to scheduling time slots for requestors to use a limited resource.

Figure 9:
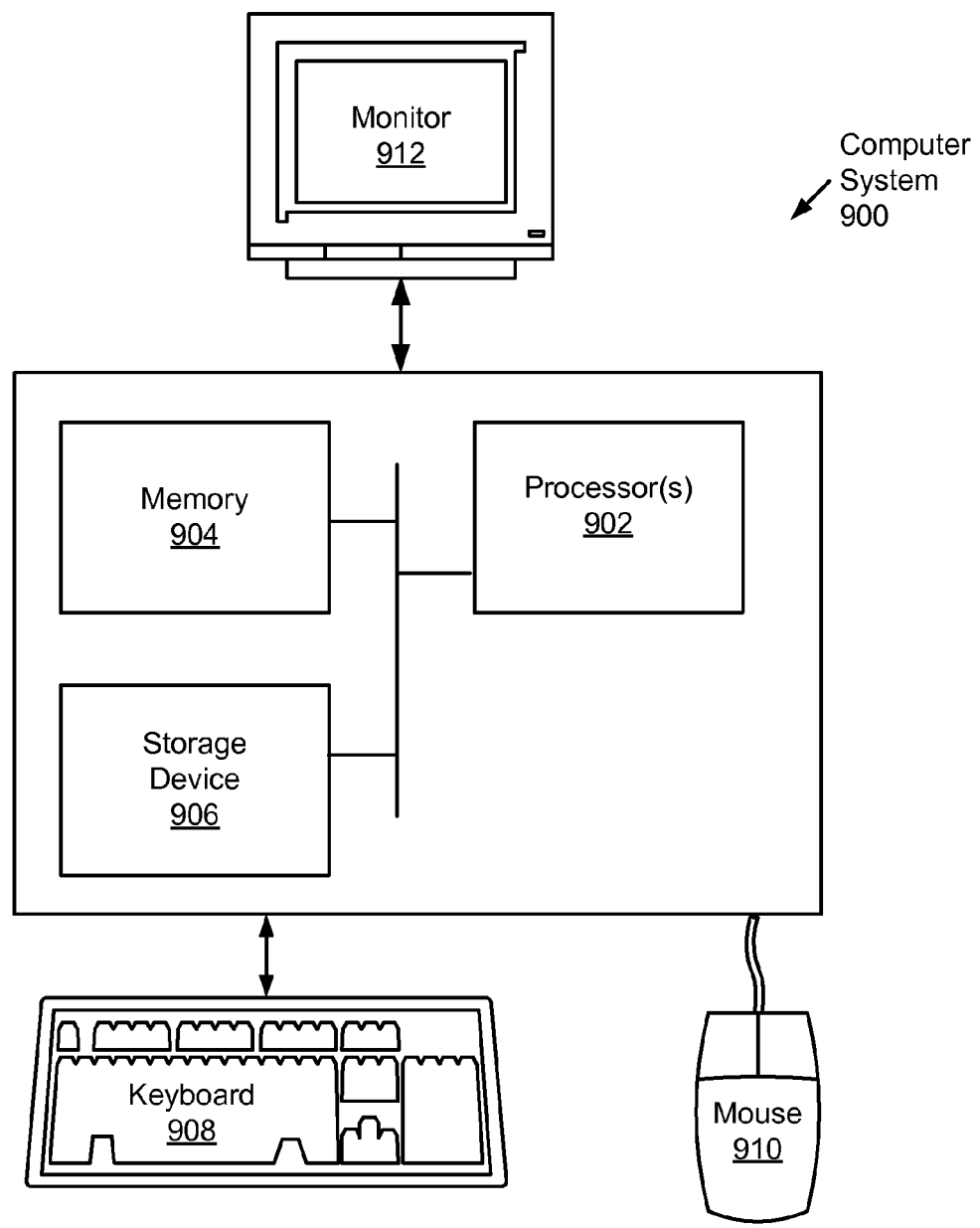
FIG. 9 shows a computer system in accordance with one or more embodiments of the invention.

FIG. 9 shows a computer system (900) in accordance with one or more embodiments of the invention. One or more portions of the invention may be a component in the computer system (900) (e.g., an integrated circuit in the computer system (900)). As shown in FIG. 9, the computer system (900) includes a processor (902), associated memory (904), a storage device (906), and numerous other elements and functionalities typical of today's computers (not shown). The computer system (900) may also include input means, such as a keyboard (908) and a mouse (910), and output means, such as a monitor (912). The computer system (900) is connected to a local area network (LAN) or a wide area network (e.g., the Internet) (not shown) via a network interface connection (not shown). Those skilled in the art will appreciate that these input and output means may take other forms, now known or later developed. Further, those skilled in the art will appreciate that one or more elements of the aforementioned computer system (900) may be located at a remote location and connected to the other elements over a network. Further, software instructions to perform embodiments of the invention may be stored on a non-transitory computer readable storage medium such as a compact disc (CD), a diskette, a tape, or any other tangible computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for managing packets, comprising:
    identifying a first plurality of packets from a first packet source having a first weight;
    identifying a second plurality of packets from a second packet source having a second weight;
    obtaining a first weight ratio based on the first weight and the second weight;
    obtaining an error threshold and a first error value corresponding to the second packet source, wherein the error threshold exceeds the first error value;
    forwarding a first packet from the first packet source in response to the error threshold exceeding the first error value;
    incrementing the first error value by the first weight ratio;
    forwarding a first packet from the second packet source, after incrementing the first error value and in response to the first error value exceeding the error threshold; and
    decrementing the first error value.

2. The method of claim 1, further comprising:
    calculating a first weight ratio by dividing the second weight by the first weight.

3. The method of claim 2, wherein the error threshold equals one-half.

4. The method of claim 1, further comprising:
    calculating a first weight ratio by multiplying the second weight by two.

5. The method of claim 4, wherein the error threshold equals the first weight.

6. The method of claim 4, further comprising:
    calculating an error decrement value by multiplying the first weight by two,
    wherein decrementing the first error value comprises subtracting the error decrement value from the first error value.

7. The method of claim 1, further comprising:
    indentifying, before obtaining the first weight ratio, a third packet source having a third weight, wherein the first weight ratio is further based on the third weight and corresponds to the second packet source;
    obtaining, before incrementing the first error value, a second weight ratio based on the first weight, the second weight, and the third weight, and corresponding to the third packet source;

obtaining, before forwarding the first packet from the first packet source, a second error value corresponding to the third packet source, wherein the error threshold exceeds the second error value, and wherein the first packet from the first packet source is forwarded further in response to the error threshold exceeding the second error value;

incrementing the first error value by the first weight ratio and incrementing the second error value by the second weight ratio after forwarding the first packet from the first packet source; and incrementing the second error value by the second weight ratio after forwarding the first packet from the second packet source.

8. The method of claim 7, further comprising forwarding a first packet from the third packet source, after incrementing the second error value and in response to the second error value exceeding the error threshold; and decrementing the second error value after forwarding the first packet from the third packet source.

9. The method of claim 8, further comprising:

determining, before forwarding the first packet from the second packet source and before forwarding the first packet from the third packet source, that the second error value exceeds the first error value, wherein the first packet from the third packet source is forwarded before the first packet from the second packet source in response to the second error value exceeding the first error value.

10. The method of claim 7, further comprising:

calculating a first sum of the first weight and the third weight;

calculating a second sum of the first weight and the second weight;

calculating a first weight ratio by dividing the second weight by the first sum; and calculating a second weight ratio by dividing the third weight by the second sum, wherein the error threshold equals one-half.

11. The method of claim 10, further comprising:

calculating a third sum of the second weight and the third weight; and calculating an error decrement value by multiplying the first sum by the second sum, by the third sum, and by two, wherein decrementing the first error value comprises subtracting the error decrement value from the first error value, and wherein decrementing the second error value comprises subtracting the error decrement value from the second error value.

12. A method for managing packets, comprising:

identifying a plurality of packet sources having a plurality of weights;

calculating a sum by adding the plurality of weights;

calculating a first weight ratio for a first packet source by dividing a first weight corresponding to the first packet source by the sum;

calculating a second weight ratio for a second packet source by dividing a second weight corresponding to the second packet source by the sum, wherein the plurality of weights comprises the first weight and the second weight;

incrementing a first error value corresponding to the first packet source by the first weight ratio;

incrementing a second error value corresponding to the second packet source by the second weight ratio;

forwarding, in response to the first error value exceeding an error value threshold after incrementing the first error value, a packet from the first packet source;

decrementing, in response to forwarding the packet, the first error value by an error decrement value; and incrementing, in response to forwarding the packet, the first error value by the first weight ratio and the second error value by the second weight ratio.

13. The method of claim 12, wherein the error value threshold is 0.5, and wherein the error decrement value is 1.

14. A non-transitory computer readable storage medium comprising instructions for managing packets, the instructions comprising functionality for:

identifying a first plurality of packets from a first packet source having a first weight;

identifying a second plurality of packets from a second packet source having a second weight;

obtaining a first weight ratio based on the first weight and the second weight;

obtaining an error threshold and an error value corresponding to the second packet source, wherein the error threshold exceeds the error value;

forwarding a first packet from the first packet source in response to the error threshold exceeding the error value;

incrementing the error value by the first weight ratio;

forwarding a first packet from the second packet source, after incrementing the error value and in response to the error value exceeding the error threshold; and decrementing the error value.

15. A system for managing packets, comprising:

a first queue storing a plurality of packets from a first packet source having a first weight;

a second queue storing a plurality of packets from a second packet source having a second weight;

a first error value counter configured to decrement in response to forwarding a packet from the second queue;

a first weight ratio register configured to store a first weight ratio based on the first weight and the second weight;

an error threshold register configured to store an error threshold; and a scheduling engine operatively connected to the first queue, the second queue, the first error value counter, the first weight ratio register, and the error threshold register, wherein the scheduling engine comprises functionality to:

forward a first packet from the first queue in response to the error threshold exceeding a value of the first error value counter;

increment the first error value counter by the first weight ratio;

forward a first packet from the second queue, after incrementing the first error value counter and in response to the value of the first error value counter exceeding the error threshold; and decrement the first error value counter.

16. The system of claim 15, wherein the scheduling engine further comprises functionality to:

calculate a first weight ratio by dividing the second weight by the first weight, wherein the error threshold equals one-half.

17. The system of claim 15, wherein the scheduling engine further comprises functionality to:

calculate a first weight ratio by multiplying the second weight by two; and calculate an error decrement value by multiplying the first weight by two, wherein the first error value counter is decremented by the error decrement value.

18. The system of claim 15, further comprising:
a third queue storing a plurality of packets from a third packet source having a third weight, wherein the first weight ratio is further based on the third weight and corresponds to the second queue;
a second error value counter configured to decrement in response to forwarding a packet from the third queue; and
a second weight ratio register configured to store a second weight ratio based on the first weight, the second weight, and the third weight, wherein the second weight ratio corresponds to the third queue,
wherein the first packet from the first queue is forwarded further in response to the error threshold exceeding a value of the second error value counter, and
wherein the scheduling engine further comprises functionality to:
   increment the first error value counter by the first weight ratio and increment the second error value counter of the second weight ratio after forwarding the first packet from the first queue; and
   increment the second error value counter by the second weight ratio after forwarding the first packet from the second queue.

19. The system of claim 18, further comprising:
an error decrement register configured to store an error decrement value;
wherein the scheduling engine further comprises functionality to:
   forward a first packet from the third queue, after incrementing the second error value and in response to the second error value exceeding the error threshold;
   decrement the second error value counter after forwarding the first packet from the third queue;
   calculate a first sum of the first weight and the third weight;
   calculate a second sum of the first weight and the second weight;
   calculate a first weight ratio by dividing the first weight by the first sum;
   calculate a second weight ratio by dividing the third weight by the second sum,
   wherein the error threshold equals one-half;
   calculate a third sum of the second weight and the third weight; and
   calculate the error decrement value by multiplying the first sum by the second sum, by the third sum, and by two,
   wherein the first error value counter is decremented by the error decrement value, and
   wherein the second error value counter is decremented by the error decrement value.

20. The system of claim 18, further comprising:
an error decrement register configured to store an error decrement value,
wherein the scheduling engine further comprises functionality to:
   forward a first packet from the third queue, after incrementing the second error value and in response to the second error value exceeding the error threshold;
   decrement the second error value counter after forwarding the first packet from the third queue;
   calculate a first weight ratio by multiplying the second weight by two;
   calculate a second weight ratio by multiplying the third weight by two;
   calculate a sum of the first weight, the second weight, and the third weight, wherein the error threshold equals the sum;
   calculate the error decrement value by multiplying the sum by two;
   obtain, before forwarding the first packet from the first queue, a third error value corresponding to the first queue, wherein the third error value exceeds the error threshold; and
   decrement the third error value by the error decrement value after forwarding the first packet from the first queue.

* * * * *

UNITED STATES PATENT AND TRADEMARK OFFICE
CERTIFICATE OF CORRECTION

PATENT NO.        : 8,547,984 B2                                    Page 1 of 1
APPLICATION NO.   : 13/234715
DATED             : October 1, 2013
INVENTOR(S)       : Eberle et al.

It is certified that error appears in the above-identified patent and that said Letters Patent is hereby corrected as shown below:

On the title page, column 2, under Other Publications, line 6, delete "Sprague," and insert -- Spraque, --, therefor.

In the Drawings

On Sheet 5 of 9, in figure 5, in step 502, delete " $W_i / \sum_{j=1, j \neq i}^{N} W_j$ " and insert -- $W_i / \sum_{j=1, j \neq i}^{N} W_j$ --, therefor.

In the Claims

In column 20, line 60, In Claim 7, delete "indentifying," and insert -- identifying --, therefor.

Signed and Sealed this
Second Day of September, 2014

Michelle K. Lee
*Deputy Director of the United States Patent and Trademark Office*